United States Patent [19]
Hahn

[11] 3,872,572
[45] Mar. 25, 1975

[54] METHOD OF ASSEMBLING KNIFE HANDLE AND BLADE

[76] Inventor: Jerome S. Hahn, 70 Schmitt Blvd., Farmingdale, N.Y. 11735

[22] Filed: Mar. 8, 1973

[21] Appl. No.: 339,174

Related U.S. Application Data

[62] Division of Ser. No. 177,328, Sept. 2, 1971, abandoned.

[52] U.S. Cl.................... 29/432.1, 29/515, 29/525, 30/342, 145/61 C, 264/249
[51] Int. Cl............................................ B23p 11/00
[58] Field of Search .......... 29/447, 432.1, 525, 445, 29/DIG. 35, 509, 515, 527.1; 30/342; 145/61R, 61 C; 264/249

[56] References Cited
UNITED STATES PATENTS

| | | | |
|---|---|---|---|
| 570,346 | 10/1896 | Steeles............................ | 30/342 X |
| 1,035,427 | 8/1912 | Donoghue...................... | 29/445 UX |
| 1,510,005 | 9/1924 | Kelley..................... | 29/DIG. 35 UX |
| 1,978,532 | 10/1934 | Gurnee............................... | 30/342 |

Primary Examiner—Charlie T. Moon
Attorney, Agent, or Firm—Amster & Rothstein

[57] ABSTRACT

A knife handle is molded from plastic to have formed therein a blade tang-receiving socket and a plurality of venting holes formed in the walls of the socket. To assemble the knife handle and blade, the tang of the knife blade is heated and then thrust into the tang-receiving socket causing the plastic walls of the receiving socket to become viscous such that the viscous plastic flows around the blade tang and positively grips the knife blade within the knife handle upon hardening of the plastic. The venting holes allow for the escape from the receiving socket of any gases and heat generated incident to the assembly operation. After sufficient cooling, the venting holes are plugged with selftapping pins.

1 Claim, 5 Drawing Figures

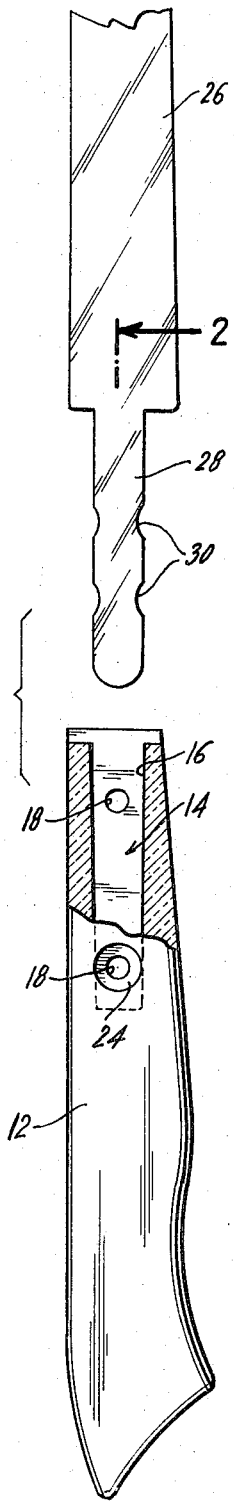
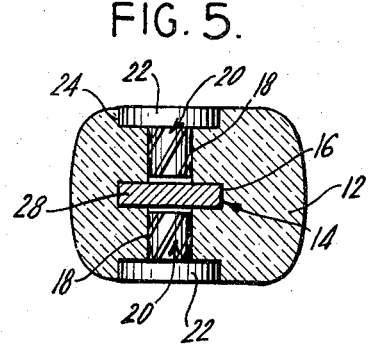
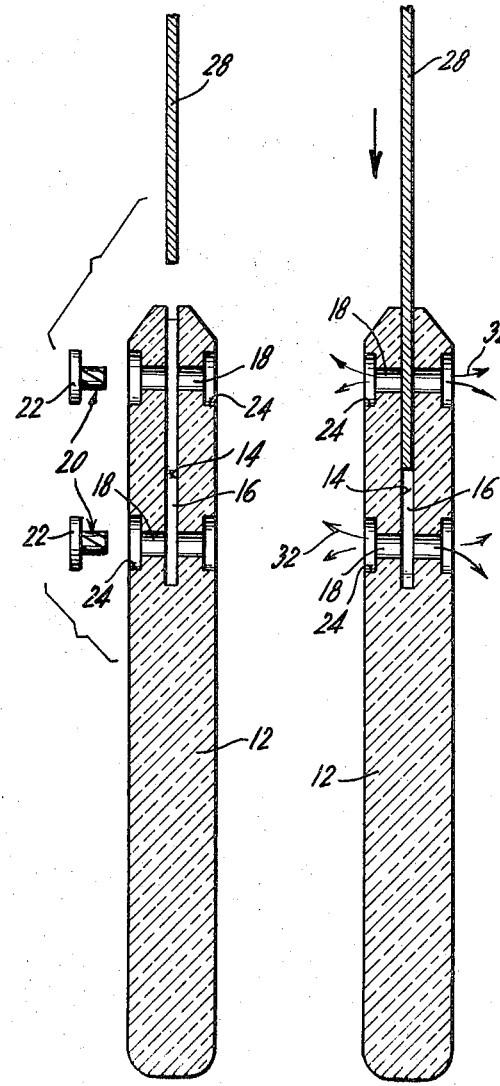
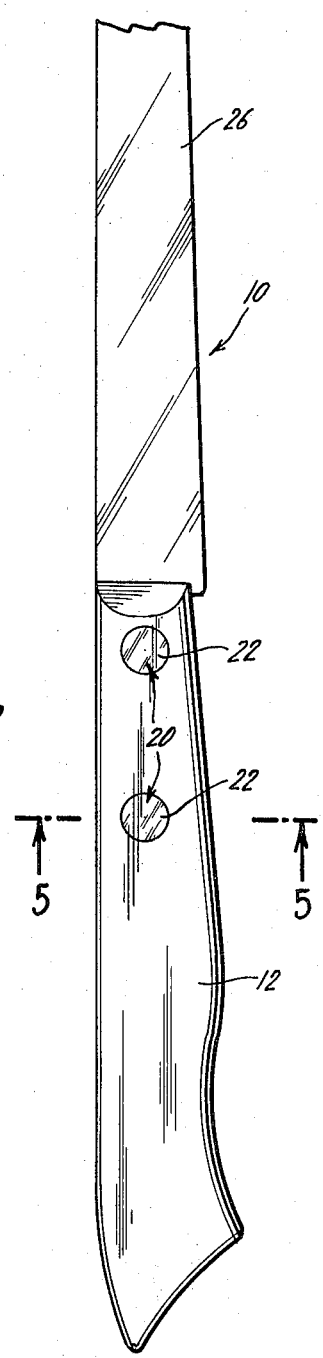
FIG. 1. FIG. 5. FIG. 4. FIG. 2. FIG. 3.
INVENTOR.
JEROME S. HAHN
BY
Amster & Rothstein
ATTORNEYS

METHOD OF ASSEMBLING KNIFE HANDLE AND BLADE

This is a division, of application Ser. No. 177,328, filed Sept. 2, 1971, now abandoned.

METHOD OF ASSEMBLING KNIFE HANDLE AND BLADE

This invention relates to cutlery and, more particularly, to a new technique for the manufacture of knives of the type having plastic handles. Advantageously, the technique provides a knife having a more failure-free construction.

Typically, in the manufacture of a knife having a plastic handle, equipment is provided for heating the tang of the knife blade to a relatively high temperature (at which the tang actually glows) whereupon the tang is thrust into an appropriately sized socket formed in the plastic handle of the knife. One of the most critical problems confronting developers of knives of this type has been the unexplained breakage of the plastic handles of these knives in the region of the blade tang. This breakage occurs most often in inexpensive knives having handles molded of polystyrene, as compared to those which are more expensive and include handles of polypropylene or nylon.

After much experimentation in assembling knives having plastic handles and steel cutting blades, it appears that the breakage or splitting of the handle may occur as a result of the joining of the two dissimilar materials to form an inseparable assembly. The unexpected breakage results from internal change in the structure of the plastic contiguous to the socket wall of the handle incident to the thrusting of the heated blade tang into the plastic socket. During this assembly operation, the heated blade tang comes in contact with the surrounding plastic material and generates gases and other by-products within the socket which causes the internal change. Moreover, the restricted area within the socket of the plastic handle limits the flow of plastic material which becomes viscous upon engagement with the heated blade, causing a certain amount of carbonization and embrittlement of the plastic material upon hardening. In addition, the heat from the blade tang becomes extremely localized within the socket walls of the plastic handle and results in "locked in" internal stresses or local faults. The compound effect of all of these factors is to cause the breakage and splitting of the plastic handle as well as the loosening of the knife assembly after a curing or aging cycle has occurred. The condition is often accelerated by environmental conditions and the type of usage.

It is an overall object of this invention to provide a new method of assembling a knife handle and blade which will overcome the problem of breakage and splitting of the plastic handle and, more particularly, a new knife construction in which the tang-receiving socket is vented through the opposite sides of the handle through venting holes.

Briefly, in accordance with the principles of my invention, a new method of assembling knives provides a knife having a more failure-free construction. The knife handle is molded from plastic having formed therein a blade tang-reciving socket and a plurality of venting holes formed in the walls of the socket. To assemble the knife handle and blade, the tang of the knife blade is heated and then thrust into the tang-receiving socket causing the plastic walls thereof to become viscous such that the viscous plastic flows around the blade tang and positively grips the knife blade within the knife handle upon hardening of the plastic. To avoid the problem of breaking or splitting of the plastic handle, venting holes are provided to allow for the escape from the tang-receiving socket of gases generated incident to the assembly operation and to aid in heat dissipation. Moreover, the release of any gases or by-products generated incident to the assembly operation, prevents any locked-in internal stresses or local faults from forming within the tang-receiving socket of the plastic handle. After sufficient venting and cooling, the venting holes are plugged with self-tapping pins to provide an attractive finished product.

Further objects, features and advantages of the present invention will become apparent upon the consideration of the following detailed description of a presently preferred embodiment when taken in conjunction with the accompanying drawings, wherein:

FIG. 1 is a side elevational view of the knife handle and blade of the present invention with the tang-receiving socket in section;

FIG. 2 is a cross-sectional view, taken on line 2—2 of FIG. 1, looking in the direction of the arrows;

FIG. 3 is a cross-sectional view illustrating the thrusting of the heated blade tang into the tang-receiving socket formed in the plastic knife handle;

FIG. 4 shows a side view of a knife construction assembled in accordance with the principles of the present invention; and FIG. 5 is a cross-sectional view, taken on line 5—5 of FIG. 4 looking in the direction of the arrows, showing the knife handle after the self-tapping plugs have been inserted into the venting holes.

Referring now to FIGS. 1 to 3, there is shown the novel structure and method of assembling the knife 10 of the present invention. In the preferred embodiment, a knife handle 12 is formed of a plastic material, such as polystyrene, and is molded to form the desired shape and contour. During the molding process, an appropriately sized blade tang-receiving socket or seat 14 is formed within plastic handle 12 by the molding of handle 12 on a blade. As may be seen in FIG. 1, tang-receiving socket 14 is formed having walls 16 which are provided with a slight inward taper of the order of 3°. This is to facilitate the stripping of the molded plastic handle 12 from the forming mold.

During the molding process, socket walls 16 are provided with one or more pairs of venting holes 18. After the assembly operation has been completed, venting holes 18 are plugged to provide an attractive finished product. This is accomplished by using self-tapping, plugging pins 20 which have heads 22 that are received in corresponding countersinks 24 provided in the outer ends of the respective venting holes 18. The self-tapping, plugging pins 20 are dimensioned so that they terminate short of tang-receiving socket 14, and, as may be seen in FIG. 5, are appropriately seated to be flush with the outer surface of knife handle 12.

There is shown in FIG. 1, one type of a knife blade 26 which is formed of an appropriate material, such as stainless steel. Knife blade 26 is provided at one end thereof with a blade tang 28 which may take a variety of shapes, as is generally understood by those skilled in the art. Blade tang 28 is formed having a series of indentations or grooves 30 which perform a gripping function which will be explained more fully hereinafter.

The method of assembling the knife blade 26 and plastic handle 12 of the present invention will now be explained, with particular reference being made to FIGS. 2 and 3. After plastic knife handle 12 has been appropriately formed or molded to include tang-receiving socket 14 and countersunk venting holes 18, blade tang 28 is heated to a relatively high temperature (at which tang 28 actually glows). Heated blade tang 28 is then thrust into the tang-receiving socket 14 of plastic handle 12. The heat transferred from blade tang 28 causes plastic socket walls 16, contiguous to tang 28, to melt and achieve a slightly viscous state. As a result, the plastic will flow around blade tang 28 and into grooves 30. As the plastic cools and hardens, the plastic located within grooves 30, and now integral with plastic handle 12, forms a positive locking device to maintain knife blade 26 permanently secured within knife handle 12.

The assembly or uniting of heated blade tang 28 and plastic handle 12, produces or generates various gases and other by-products which escape from tang-receiving socket 14 through venting holes 18, as depicted by arrows 32 in FIG. 3. Moreover, venting holes 18 allow heat to dissipate from within socket 14 and thereby reduce the possibility of any "hot spots" forming. After knife handle 12 and blade tang 28 have sufficiently cooled and all the gases and by-products generated incident to the assembly operation have escaped, the final step in the assembly operation may be completed. This involves the plugging of venting holes 18 and is accomplished by inserting self-tapping, plugging pins 20 into their corresponding counter-sunk venting holes 18. As mentioned above, self-tapping, plugging pins 20 are dimensioned so that they terminate short of the medially disposed blade tang 28 and do not interfere with the same such that plugging pins 20 may be appropriately seated to be flush with the respective opposite sides or surface of knife handle 12.

From the foregoing, it will be appreciated that there has been provided in accordance with the present invention, a new method of assembling a knife handle and blade which provides a new knife construction in which the tang-receiving socket has formed therein a plurality of venting holes which allow gases and other by-products to escape and heat to dissipate, generated as a result of thrusting a heated blade tang into the socket of the plastic handle. In this manner, a plastic handle is provided free from internal stresses or local faults which heretofore has caused the breakage and splitting of the handle as well as the loosening of the knife assembly after a curing or aging has occurred.

A latitude of modification, change and substitution is intended in the foregoing disclosure and in some instances, some features of the invention will be employed without a corresponding use of other features. Accordingly, it is appropriate that the appended claims be construed broadly and in a manner consistent with the spirit and scope of the invention herein.

What is claimed is:

1. A method of assembling a plastic knife handle and a knife blade having a blade tang formed at one end thereof, which comprises the steps of molding the knife handle and forming a blade tang-receiving socket therein, forming vent holes in the walls of said tang-receiving socket, heating said blade tang, inserting said heated blade tang into said tang-receiving socket, said insertion generating gases within said tang-receiving socket which are vented through said vent holes and plugging said vent holes after said gases have dissipated.

* * * * *